United States Patent [19]

Van Duyn

[11] Patent Number: 4,707,770

[45] Date of Patent: Nov. 17, 1987

[54] SUPPORT SHOE FOR A VEHICLE HEADLAMP ASSEMBLY

[75] Inventor: Paul D. Van Duyn, Anderson, Ind.

[73] Assignee: General Motors Corporation, Detroit, Mich.

[21] Appl. No.: 886,147

[22] Filed: Jul. 16, 1986

[51] Int. Cl.⁴ .............................................. B60Q 1/06
[52] U.S. Cl. ...................................... 362/66; 362/61; 362/80; 403/77
[58] Field of Search ...................... 362/66, 61, 80, 372, 362/427, 270, 273, 371, 428, 430, 69; 403/77

[56] References Cited

U.S. PATENT DOCUMENTS 4,318,161 3/1982 Shanks .............................. 362/61 X
4,607,976 8/1986 Peek et al. ............................ 403/77
4,621,307 11/1986 Weber ................................ 362/80 X Primary Examiner—Larry Jones
Attorney, Agent, or Firm—Edward J. Biskup

[57] ABSTRACT

A support shoe for pivotably connecting a headlamp body to a support frame and including a block member and a retaining member each of which is provided with a spherical surface so, when the block member and retaining member are interconnected, a socket is formed for the ball portion of the ball stud connected to the headlamp body.

3 Claims, 10 Drawing Figures

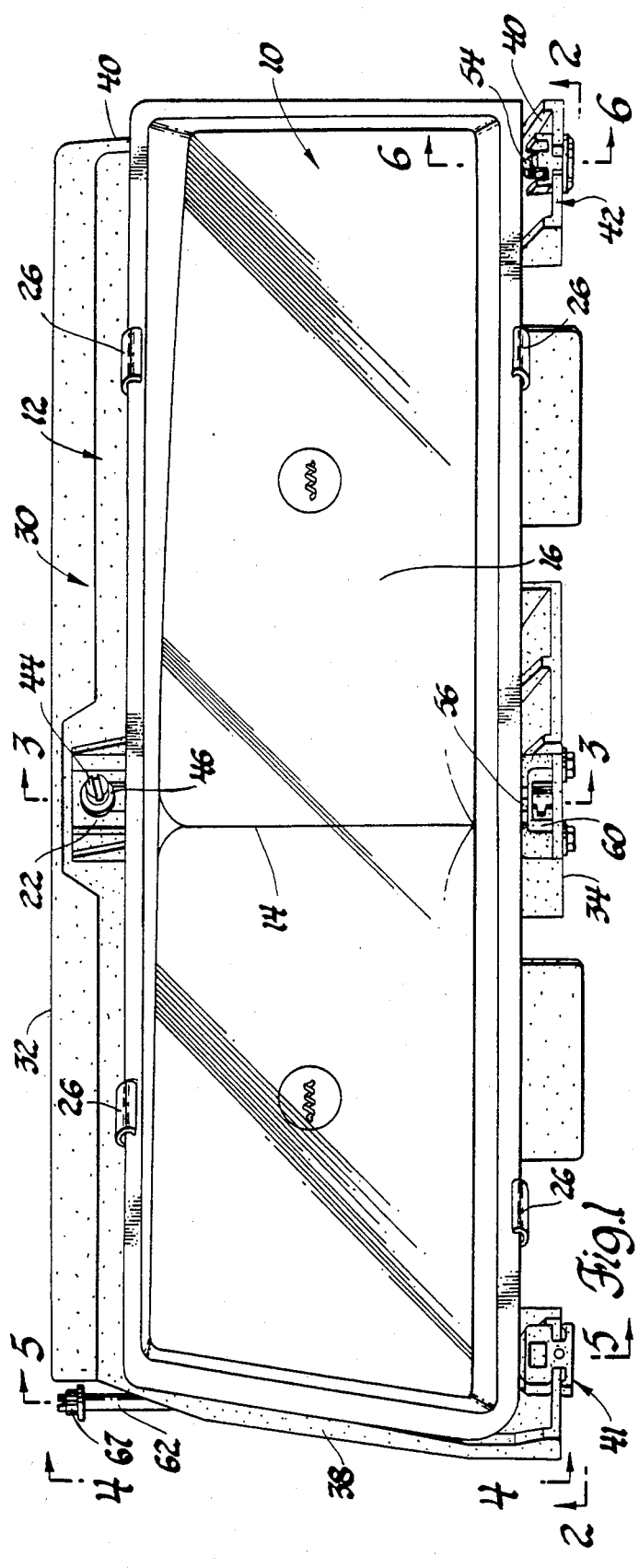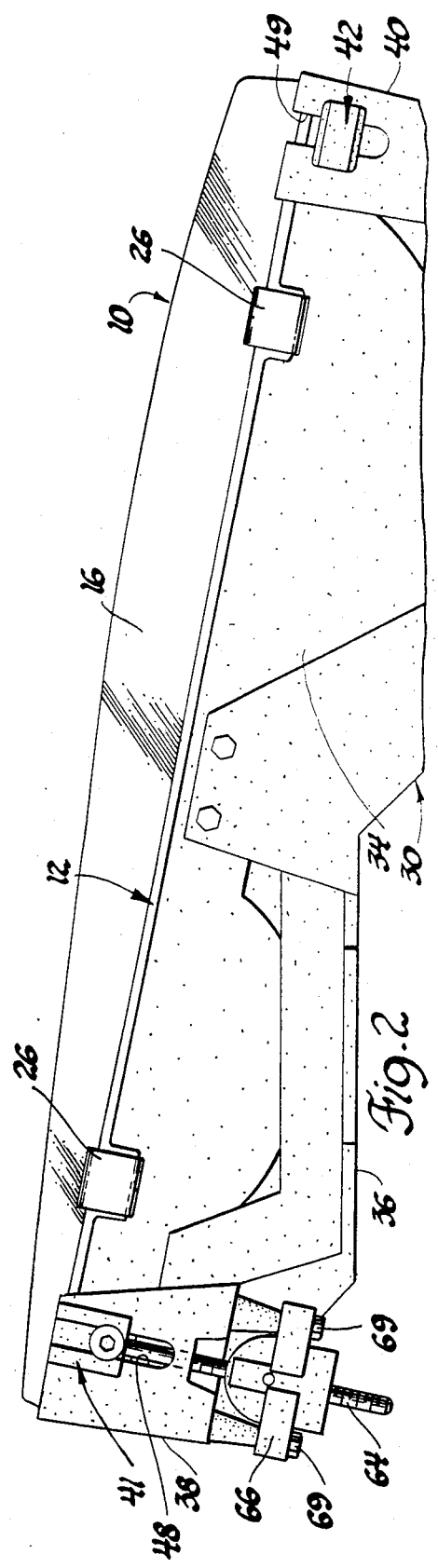

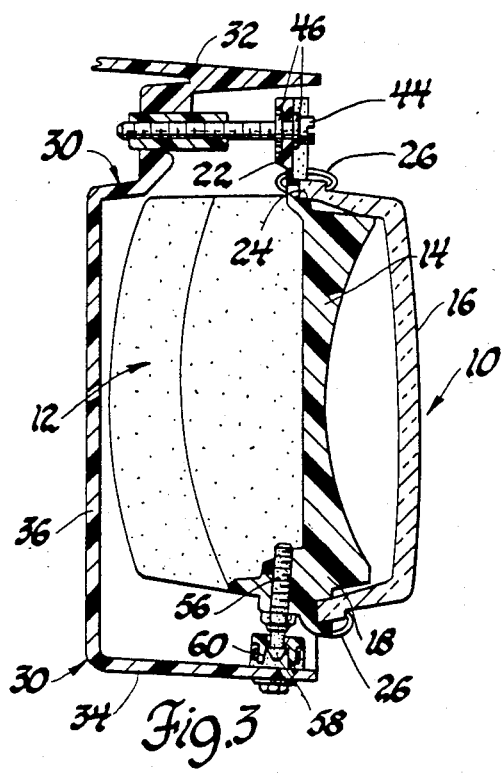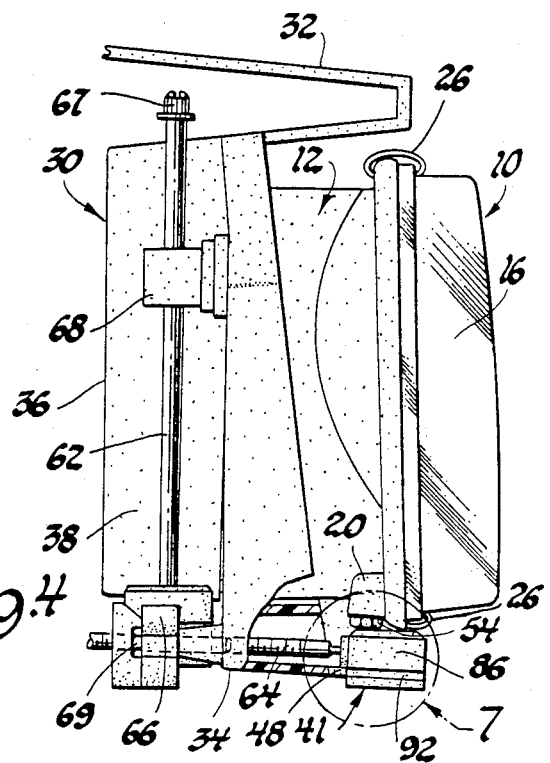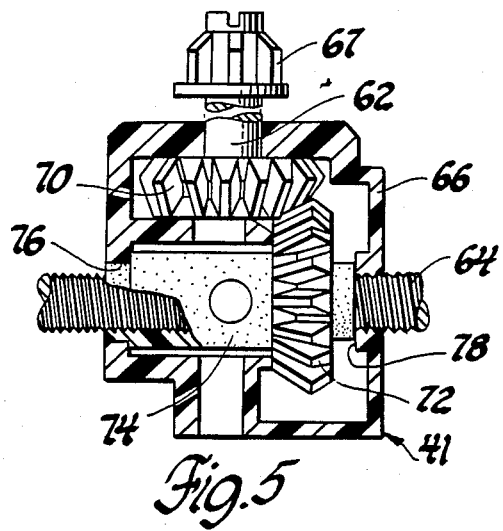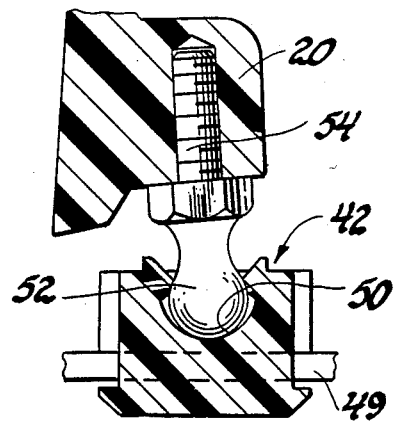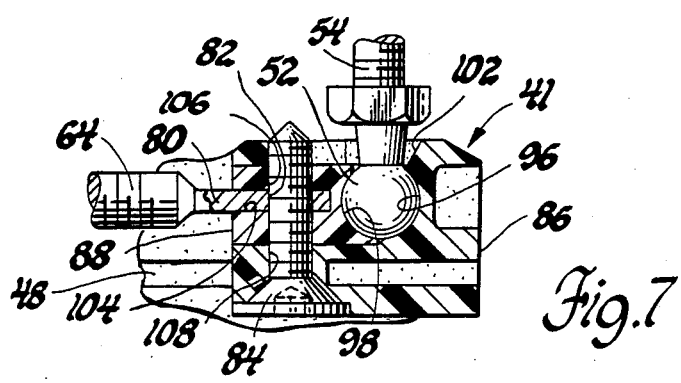

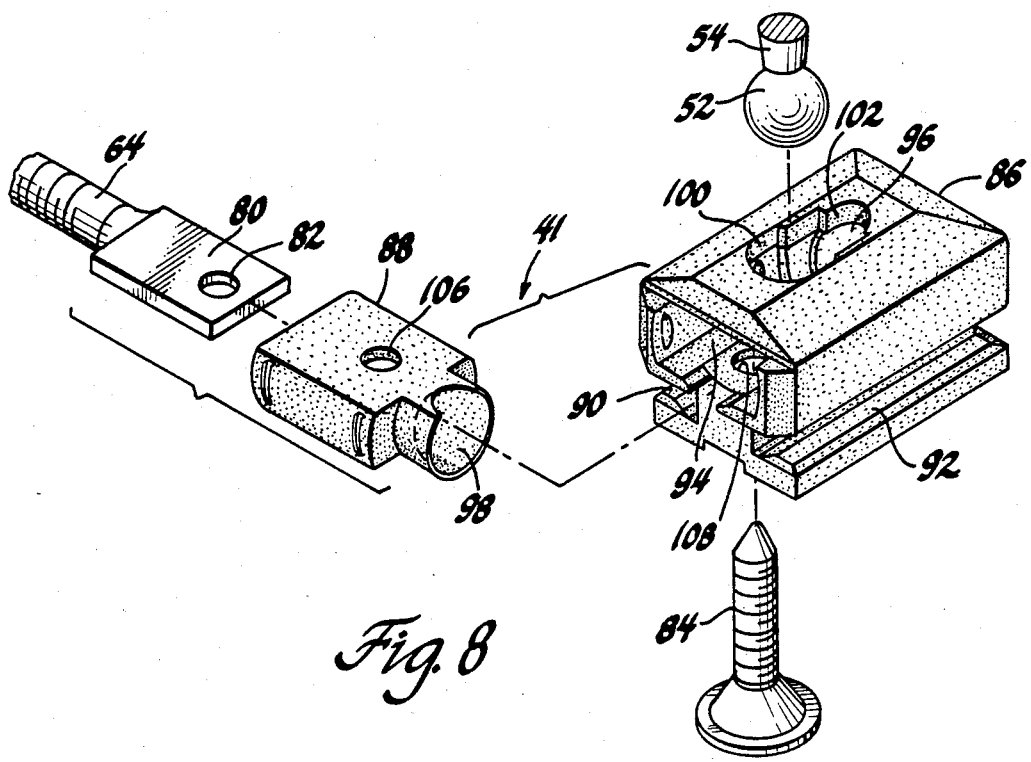
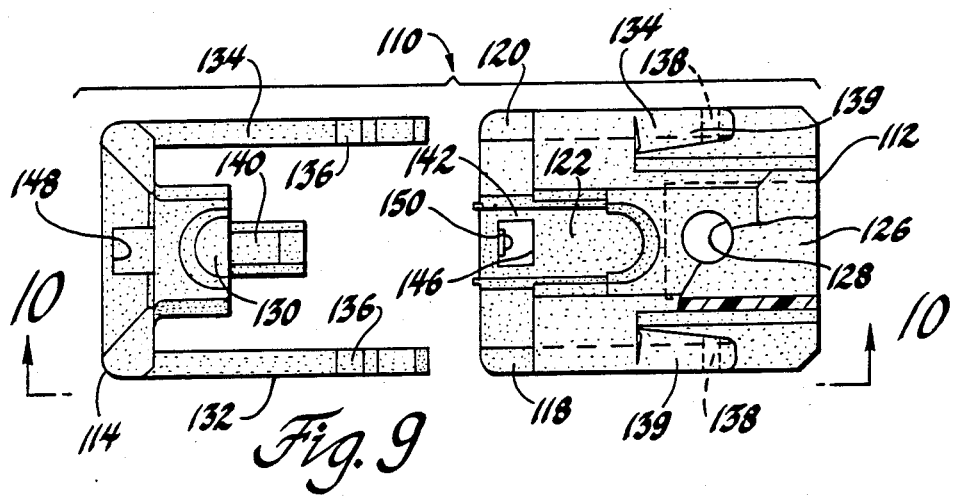
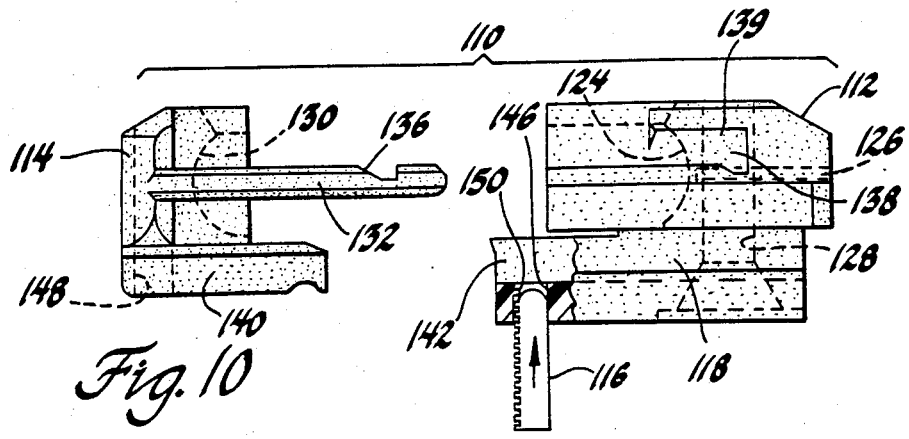

SUPPORT SHOE FOR A VEHICLE HEADLAMP ASSEMBLY

This invention relates to vehicle lamps and more particularly to aim-adjustable vehicle headlamps.

Copending U.S. patent application Ser. No. 824,197 filed on Jan. 30, 1986 in the name of McMahan et al and assigned to the assignee of this invention, discloses a headlamp assembly incorporating an improved adjustment arrangement in which manipulations of aiming adjusters may take place at any location about the margin of the lamp from the front, side or rear, at the selection of the designer, to satisfy whatever styling or structural concerns which may dominate. One feature of the headlamp assembly shown in the aforementioned application is the use of support shoes at the opposite ends of the lamp body for connecting the latter to the support frame and allowing selective pivotal movement of the lamp body about a horizontal axis and a vertical axis.

The present invention concerns a support shoe construction that is similar to that referred to above but, rather than being a one-piece construction as shown in the aforementioned application, is formed of two interconnecting parts which together form a socket for the ball portion of the ball stud connected to the lamp body.

More specifically, the support shoe according to the present invention is combined with a vehicle headlamp assembly having a lamp body received between frame walls of a support frame and including pivot means on the frame walls so that the lamp body is aligned on a vertical axis about which the lamp body is adapted for rotatable adjustment relative to the frame. A guidance slot is formed in the frame at one side of the vertical axis and is generally aligned on an arc originated on such axis. The support shoe is slidably received in the slot for supporting the lamp body on the frame and is connected to an adjustment means which effects adjustment of the lamp body about the vertical axis. The support shoe includes a block member and a retaining member, the former of which has a pair of laterally spaced longitudinally extending channels formed on opposite sides thereof for cooperation with the guidance slot in the frame for allowing sliding movement therealong. A cavity is formed in the block member for receiving the ball portion of a ball stud secured to the lamp body and has a first spherical surface for engaging the ball portion. The retaining member is adapted to be inserted into the cavity and has a second spherical surface for capturing and retaining the ball portion of the ball stud within the block member so as to form a socket for the ball portion.

Other features and advantages of the invention will be apparent from the following specification and from the drawings wherein:

FIG. 1 is a front elevational view of a vehicle headlamp assembly according to the invention;

FIG. 2 is a bottom view, partially broken away, taken along the plane indicated 2—2 in FIG. 1;

FIG. 3 is a sectional view taken along the plane indicated 3—3 in FIG. 1;

FIG. 4 is an end view taken along the plane indicated 4—4 in FIG. 1;

FIG. 5 is an enlarged sectional view taken along the plane indicated 5—5 in FIG. 1;

FIG. 6 is an enlarged sectional view taken along the plane indicated 6—6 in FIG. 1;

FIG. 7 is an enlarged view, partially in section, of a portion of FIG. 4;

FIG. 8 is an exploded view of the support shoe and parts thereof shown in FIGS. 4 and 7;

FIG. 9 shows a modified form of the support shoe seen in FIGS. 4, 7 and 8; and

FIG. 10 is a view taken on line 10—10 of FIG. 9.

Referring now to FIGS. 1-3 of the drawings, the same illustrate an exemplary embodiment of the invention of the so-called styled headlamp variety for upscale automotive vehicle bodies. Such assembly includes a rectangular headlamp body 10, comprised of an elongated, dish-like, multiple cavity reflector member 12, the cavities of which may be separated by a web or webs 14, and the open front face of which is covered by a glass or like material lens element 16. As viewed best in FIG. 3, the reflector member 12 may be molded of a suitable polymer, particularly to include a variety of thickened portions for provision of mounting details as will be described. Such thickened portions include a region 18 at the lower margin of the reflector adjacent web 14, and similar such regions 20, FIG. 4, at opposite lateral ends of the reflector member. Reverting to FIG. 3, another thickened flange area 22 is provided above the web 14. Suitable grooving or channeling, as at 24, is provided around the entire margin of the open face of the reflector member 12 to receive the flange like margins of the lens 16. An adhesive and sealant such as butyl may be added at the inner face of the lens flange to prevent the ingress of foreign material and the lens 16 is retained on the reflector member 12 by such means as clips 26. Conventional lamp bulbs may be provided, as is well known, in each of the several reflector cavities for low beam, high beam or parking lamp illumination selected at the will of the driver.

As seen in FIGS. 1-3 the headlamp assembly also includes a box-like support frame, generally designated as 30. This frame 30 may also be fabricated of a polymer material molded to a shape, such as shown, preferably providing spaced horizontally extending upper and lower walls 32 and 34, respectively, joined by a back wall 36 and by opposite end walls 38 and 40. Frame 30 is suitably affixed to the front body structure, not shown, of the vehicle body by whatever conventional means desired.

The lamp body 10 is in turn mounted on support frame 30 by a pair of slidable support shoes 41 and 42, seen best in detail in FIGS. 2, 6 and 7, as well as by an upper adjustable fastener 44. Fastener 44 is a threaded element having a head suitably tooled for reception of a hand adjusting device, such as a screwdriver, and having a threaded shank screwed into a thickened portion of the back wall 36 of the frame 30. The head portion of the fastener 44 has spaced shoulders 46 which capture the wall in region 22 of the reflector member 12. The fastener 44 is, in the illustrated case, accessible from the front of the vehicle and normally hidden, for example, by the lower marginal edge of the lip of the vehicle hood. It might alternatively be reversed for access from the rear, with the hood open and properly mounted to flange 22.

Referring to FIG. 2, and to FIG. 6, the lower wall 34 of frame 30 is slotted at the end regions thereof as at 48 and 49 to respectively receive the support shoes 41 and 42. Each support shoe 41 and 42 is of molded polymer with integral upper and lower portions embracing in the channel-like gaps therebetween the thickness of the slotted lower wall 34 at each location. The upper portion of each such support shoe 41 and 42 is molded with a socket-like recess 50 receiving ball head 52 of a ball stud 54 having a threaded shank screwed into each of the opposite thickened regions 20, respectively, of reflector member 12 adjacent end walls 38 and 40.

The two ball heads 52 of the ball studs 54 are located in a horizontal plane of the support frame 30 and together through their centers define an instantaneous axis of rotation for aiming adjustment of the lamp body 10 in vertical planes. Such adjustment is of course effected by manipulated rotation of fastener 44 by a screwdriver or the like.

Aiming or adjustment of lamp body 10 in the horizontal planes, on the other hand, about a vertical axis is effected by manipulation of the shoe 41. The vertical axis for such horizontal adjustment is established by the shouldered head of upper fastener 44 and a lower pivot stud 56. Such pivot stud 56, seen best in FIG. 3, includes a threaded shank screwed into the thickened portion 18 of the reflector member 12 and a bullet-shaped nose 58 which is pushed through a tapered aperture into a cavity of a polymeric molded pivot seat 60 secured to the lower wall 34 of the frame at a location vertically aligned with fastener 44 and proximate the horizontal axis through ball head 52. The nose 58 is simply held laterally for rotation in such pivot seat 60 such that, together with the head of upper fastener 44, it defines the vertical axis of headlamp adjustment while also being sufficiently close to the horizontal adjustment axis that it offers no impediment thereto.

As earlier mentioned, support shoes 41 and 42 are slidable within slots 48 and 49 of frame 30 to provide for adjustment of the lamp body. The slots 48 and 49 may of course be aligned generally on circular arcs centered on the vertical axis through pivot seat 60, or on tangents thereto as might be accommodated by slight amounts of play, as between the shoes and the lower wall 34 of the frame, for example. Adjustment is effected by an angularly arranged adjustment apparatus, seen best in FIG. 4. The present exemplary embodiment illustrates one case of a desired orientation for the apparatus, including a pair of orthogonally arranged shafts 62 and 64 which are interconnected in a housing 66. The vertical shaft 62 has a head 67 located adjacent the upper wall 32 of the support frame 30 at a location easily manipulated by a hand screwdriver or the like, and arranged for rotation within a support clip 68 attached to back wall 36 of the frame 30. The lower end of shaft 62 extends into the gear housing 66 which is likewise suitably attached to the back wall 36 as by screws 69. As seen best in FIG. 5, the lower end of shaft 62 has mounted thereto a bevel gear 70 which meshes with a bevel gear 72 secured to a drive nut 74 one end of which is suitably journaled in a circular recess 76 of the gear housing 66. The other end of the drive nut 74 abuts a shoulder 78 formed in the housing 66. The shaft 64 has its entire length threaded and the threads thereof engage the internal threads of the drive nut 74 so upon rotation of the latter, the shaft 64 is moved longitudinally fore and aft. As seen in FIGS. 7 and 8, the forward end 80 of the shaft 64 is formed with an aperture 82 through which a screw 84 extends to fasten the shaft 64 to the shoe 41 so as to prevent rotation of the shaft 64. Thus, from the above description, it should be apparent that a selected rotation by a screwdriver or the like applied to the head 67 of shaft 62 will cause rotation of the bevel gears 70 and 72 and rotation of the drive nut 74 within in its gear housing 66, resulting in a longitudinal movement of the shaft 64 and sliding adjustment of the engaged support shoe 41 and the opposite shoe 42 fore or aft in their slots 48 and 49, so that the headlamp body 10 is adjusted or aimed relative to frame 30 about the vertical axis defined on the latter.

As seen in FIGS. 7 and 8, the shoe 41 includes the screw 84, a block member 86, and a retaining member 88. Both the block member 86 and the retaining member 88 are molded from a plastic material with the former having the opposite sides thereof provided with laterally spaced, longitudinal extending and parallel channels 90 and 92 which allow the shoe to slide within the slot 48. The block member 86 is also formed with a cavity 94 which is rectangular in cross section and opens at one end of the block member 86 to receive the retaining member 88 which is sized so as to tightly fit within the cavity 94. The other end of the cavity 94 is formed with a semispherical surface 96 which cooperates with a semispherical surface 98 formed on the retaining member 88 for providing a socket for the associated ball head 52 of the stud 54. Accordingly, as seen in FIG. 7, when the retaining member 88 is inserted into the cavity 94 of the block member 86, the semispherical surfaces 96 and 98 form a socket for maintaining the ball head 52 within the block member 86. It will be noted that the ball head 52 is initially positioned within the cavity 94 via an enlarged opening 100 after which it is moved towards the semispherical surface 96 above which is a smaller opening 102 which prevents the ball head 52 from being dislodged from the block member 86. It will also be noted that the retaining member 88 is formed with a cavity 104 and an aperture 106. As a result, after the ball head 52 is positioned in the cavity 96 of the block member 86 and the retaining member 88 is inserted into the cavity 96 to form the aforementioned socket for the ball head 52, the end 80 of the shaft 64 is inserted into the cavity 104 of the retaining member 88 at which time the aperture 106 thereof registers with the aperture 82 and both of the latter mentioned apertures register with an aperture 108 formed in the base of the block member 86. At this time, the self tapping screw 84 serves to interconnect and lock together the shaft 64, retaining member 88, block member 86, and the ball head 52.

FIGS. 9 and 10 show a modified form of the shoe 41 which, in this case, is identified by reference numeral 110. The shoe 110 includes a block member 112, a retaining member 114, and a locking member 116. The block member 112 is formed with laterally spaced, longitudinally extending and parallel channels 118 and 120 which correspond to the channels 90 and 92 and similarly cooperate with the side walls of a slot for allowing the shoe 110 to slide relative to the supporting wall 34 of the frame 30. The block member 112 is also formed with a cavity 122 one end of which is open and the other end of which is closed and formed with a semispherical surface 124. A second cavity 126 is provided in the block member 112 for receiving the end 80 of the shaft 64 after which the screw 84 can be inserted into an accommodating opening 128 for connecting the shaft 64 to the block member 112. The retaining member 114 is formed with a semispherical surface 130 which is adapted to cooperate with the surface 124 to form the socket for the ball head 52. In this regard, it will be noted that the retaining member 114 has a pair of parallel and laterally spaced arms 132 and 134 each of which has a notch 136 provided therein that cooperates with a tab 138 formed on laterally spaced fingers 139 on opposite sides of the block member 112 that cooperate with the notches 136 for interconnecting the block member 112 to the retaining member 114. Thus, as seen in FIGS. 9 and 10, when the retaining member 114 is moved to the right, the base 140 thereof slides within a guide track 142 in the block member 112 until the notch 136 of each arm 132 and 134 receives the tabs 138 of the fingers 139. At this time, the semispherical surfaces 124 and 130 will capture the ball head 52 positioned within the cavity 122. Afterwards, the lock member 116, which is in the form of a square peg having teeth along one side, is inserted in the direction of the arrow through the vertically aligned square apertures 146 and 148 of the block member 112 and the retaining member 114 to lock the two members together. A tooth 150 formed in the aperture 146 cooperates with the teeth on the lock member 116 for providing the locking action.

Various changes and modifications can be made in the construction of this apparatus without departing from the spirit of the invention. Such changes and modifications are contemplated by the inventor, and he does not wish to be limited except by the scope of the appended claims.

The embodiments of the invention in which an exclusive property or privilege is claimed are defined as follows:

1. In combination with a vehicle headlamp assembly having a lamp body received between frame walls of a support frame and including pivot means on said frame walls and said lamp body aligned on a vertical axis about which said lamp body is adapted for rotatable adjustment relative to said frame, a guidance slot in said frame positioned to one side of said axis and generally aligned on an arc originating on said vertical axis, a support shoe slidably received in said slot to support the lamp body on said frame and connected to an adjustment means which effects adjustment of said lamp body about said vertical axis, said support shoe comprising two interconnecting parts which consist of a block member and a retaining member, said block member having a pair of laterally spaced longitudinally extending channels formed on opposite sides of said block member for cooperating with said guidance slot in said frame for allowing sliding movement therealong, a cavity formed in said block member for receiving the ball portion of a ball stud secured to said lamp body and having a first spherical surface for engagement with said ball portion, said retaining member adapted to be inserted into said cavity and having a second spherical surface for engaging said ball portion and cooperating with said first spherical surface to provide a socket for and retain the ball portion of said ball stud within said block member.

2. In combination with a vehicle headlamp assembly having a lamp body received between frame walls of a support frame and including pivot means on said frame walls and said lamp body aligned on a vertical axis about which said lamp body is adapted for rotatable adjustment relative to said frame, a guidance slot in said frame positioned to one side of said axis and generally aligned on an arc originating on said vertical axis, a support shoe slidably received in said slot to support the lamp body on said frame and connected to an adjustment means which effects adjustment of said lamp body about said vertical axis, said support shoe comprising two interconnecting parts which consist of a block member and a retaining member, said block member having a pair of laterally spaced longitudinally extending channels formed on opposite sides of said block member for cooperating with said guidance slot in said frame for allowing sliding movement therealong, a cavity formed in said block member for receiving the ball portion of a ball stud secured to said lamp body and having a first spherical surface for engagement with said ball portion, said retaining member adapted to be inserted into said cavity and having a second spherical surface for engaging said ball portion and cooperating with said first spherical surface to provide a socket for and retain the ball portion of said ball stud within said block member, and lock means extending through said block member into said retaining member for fixedly interconnecting the block member and the retaining member.

3. In combination with a vehicle headlamp assembly having a lamp body received between frame walls of a support frame and including pivot means on said frame walls and said lamp body aligned on a vertical axis about which said lamp body is adapted for rotatable adjustment relative to said frame, a guidance slot in said frame positioned to one side of said axis and generally aligned on an arc originating on said vertical axis, a support shoe slidably received in said slot to support the lamp body on said frame and connected to an adjustment means which effects adjustment of said lamp body about said vertical axis, said support shoe comprising two interconnecting parts which consist of a block member and a retaining member, said retaining member having a pair of laterally spaced arms each of which is formed with a notch, said block member having a pair of laterially spaced longitudinally extending fingers each of which has a tab that cooperates with said notch for interconnecting said block member to said retaining member, a pair of channels formed on opposite sides of said block member below said fingers for cooperating with said guidance slot in said frame for allowing sliding movement therealong, a cavity formed in said block member for receiving the ball portion of a ball stud secured to said lamp body and having a first spherical surface for engagement with said ball portion, said retaining member adapted to be inserted into said cavity and having a second spherical surface for engaging said ball portion and cooperating with said first spherical surface to provide a socket for and retain the ball portion of said ball stud within said block member, and lock means in the form of a toothed peg extending through said block member into said retaining member for fixedly locking the retaining member to the block member.

* * * * *